(12) United States Patent
Park

(10) Patent No.: US 8,389,633 B2
(45) Date of Patent: Mar. 5, 2013

(54) SUSPENSION PARTICLE COMPRISING TETRAFLUOROETHYLENE POLYMER AND MANUFACTURING METHOD THEREOF

(76) Inventor: Ji-Ho Park, Seoul (KR)

( * ) Notice: Subject to any disclaimer, the term of this patent is extended or adjusted under 35 U.S.C. 154(b) by 28 days.

(21) Appl. No.: 11/817,988

(22) PCT Filed: Jan. 20, 2006

(86) PCT No.: PCT/KR2006/000235
§ 371 (c)(1),
(2), (4) Date: Jul. 1, 2008

(87) PCT Pub. No.: WO2006/095963
PCT Pub. Date: Sep. 14, 2006

(65) Prior Publication Data
US 2008/0275188 A1    Nov. 6, 2008

(30) Foreign Application Priority Data
Mar. 10, 2005    (KR) .................. 10-2005-0019972

(51) Int. Cl.
*C08F 259/08* (2006.01)
*C08F 290/00* (2006.01)
*C08L 51/00* (2006.01)
*C08L 55/02* (2006.01)

(52) U.S. Cl. ........ 525/199; 525/242; 525/244; 525/276; 525/313; 525/902

(58) Field of Classification Search .................. 525/199, 525/222, 241, 276, 902, 242, 244, 243, 298, 525/301, 302, 191, 238, 313
See application file for complete search history.

(56) References Cited

U.S. PATENT DOCUMENTS

| | | | | |
|---|---|---|---|---|
| 4,208,499 A | * | 6/1980 | Maruhashi et al. | 526/202 |
| 5,037,913 A | * | 8/1991 | Leussler et al. | 526/201 |
| 5,679,741 A | | 10/1997 | Breton et al. | |
| 5,804,654 A | * | 9/1998 | Lo et al. | 525/67 |
| 7,183,356 B2 | | 2/2007 | Ishida | |
| 2005/0014003 A1 | * | 1/2005 | Takei et al. | 428/407 |

FOREIGN PATENT DOCUMENTS

| | | |
|---|---|---|
| EP | 0393480 A1 | 10/1990 |
| FR | 2733503 A1 | 10/1996 |
| GB | 952452 | 3/1964 |
| JP | 58209752 | 6/1983 |
| JP | 03-205451 | 2/1993 |

OTHER PUBLICATIONS

Machine translation of JP 03-205451.*

* cited by examiner

*Primary Examiner* — Irina S Zemel
*Assistant Examiner* — Jeffrey Lenihan
(74) *Attorney, Agent, or Firm* — Wood, Herron & Evans, LLP

(57) ABSTRACT

Disclosed therein is method for preparing novel suspension polymer comprising tetrafluoroethylene polymer, and powders or granules produced by the method. The suspension polymer of the present invention can be obtained by suspension polymerization of a styrene-based monomer, an acrylic monomer or a mixed monomer thereof in the presence of PTFE, followed by filtering and drying, and can be used as flame retarding properties improver of engineering plastic and the like.

3 Claims, No Drawings

SUSPENSION PARTICLE COMPRISING TETRAFLUOROETHYLENE POLYMER AND MANUFACTURING METHOD THEREOF

TECHNICAL FIELD

The present invention relates to a novel suspension polymer comprising a tetrafluoroethylene polymer (hereinafter, referred to as "PTFE" and manufacturing method thereof, and more specifically to a method of manufacturing powders or granules produced by aqueous suspension polymerizing a styrene-based monomer, an acrylic monomer or a mixed monomer thereof in the presence of PTFE.

BACKGROUND ART

Engineering plastics such as ABS/PC, PC, PBT, Noryl, nylon and the like have been used as various home appliances and electric materials. In case of using such products, a flame retardancy of the products is considered importantly when a fire occurs. Among them, a drip phenomenon that a portion of the molten products is dropped with flame is particularly problematic. To prevent the drip phenomenon, namely to provide an anti-drip property, various methods have been developed. One of them is that PTFE is used as an anti-drip flame-retarding additive.

In industrial sites, a method of simply kneading PTFE powders into engineering plastics has mainly been used. However, in case of direct use of PTFE to the products, dispersability is poor. Therefore, many methods for improving the dispersability of PTFE have been developed. To improve the dispersability of PTFE, the powders containing PTFE have been developed.

EP-A-0,166,187 discloses a PTFE containing powder composition. The powder is obtained by mixing poly(tetrafluoroethylene) dispersoids, and a graft polymer latex, for example a latex of acrylonitrile-butadiene-styrene graft polymer, salting out, filtering and then drying the mixture. However, the powder obtained by co-precipitation or co-salting out embraces a problem in that it has a tendency of self-adhesion. In particular, when the PTFE content is high, for example, the PTFE is contained in an amount of 25% by weight or more based on the total weight of the composition, the condition becomes worse. As a result, since the powder does not flow freely, it is difficult to handle and store.

U.S. Pat. No. 5,804,654 discloses a tetrafluoroethylene polymer containing powder obtained by emulsion polymerizing a mixture of acrylonitrile and styrene monomer in the presence of a tetrafluoroethylene polymer latex and encapsulating the tetrafluoroethylene polymer. In the above patent, since the tetrafluoroethylene polymer containing powder can be obtained in the form of a freely-flowing powder, there is no self-adhesion of powders. However, such a process is so complicate, since it comprises emulsion polymerization of tetrafluoroethylene to firstly obtain a PTFE latex, addition of monomers to the obtained PTFE latex, polymerization of a resultant mixture to secondly obtain a latex product, and salting out the obtained latex product to enlarge particles so as to use the resulting latex in the form of powder.

Therefore, there is still a need for a method that can more simply obtain a PTFE-containing powder.

DISCLOSURE

Technical Problem

Accordingly, it is an object of the present invention to provide a method for manufacturing a powder that comprises PTFE and is suspension polymerized.

It is another object of the present invention to provide a method for manufacturing an anti-drip powder comprising PTFE by suspension polymerizing a styrene-based monomer, an acrylic monomer or a mixed monomer thereof in the presence of PTFE.

It is another object of the present invention to provide a polymer prepared by using an anti-drip PTFE obtained by suspension polymerization of a monomer or a monomer mixture in the presence of PTFE.

Technical Solution

The present inventors have found that the above objects can be accomplished by suspension polymerizing a styrene-based monomer, an acrylic monomer or a mixed monomer thereof in the presence of PTFE, and have completed this invention.

According to the present invention, there is provided a method for suspension polymerizing a styrene-based monomer, an acrylic monomer or a mixed monomer thereof in the presence of PTFE to obtain a powder comprising PTFE.

As tetrafluoroethylene polymer particles, poly(tetrafluoroethylene), tetrafluoroethylene-hexafluoroethylene copolymer and copolymer tetrafluoroethylene with a minor amount of ethylenically unsaturated monomer that can be copolymerized with tetrafluoroethylene are used. These polymers are known, and are found inter alia in *Vinyl and related polymers?* Schidknecht, John Wiley & Sons, Inc., New York, 1952, pages 484-494 and *Fluoropolymers*" Woll, Wiley-Interscience, John Wiley & Sons, Inc., New York, 1972. Preferably, poly(tetrafluoroethylene) can be used.

In the present invention, the PTFE may be used in suspension polymerization system in the form of fine powders, suspensions, latex or the like.

In an embodiment according to the present invention, the PTFE may be used in the form of dried fine particles. In this case, the fine particles may be directly introduced into a reaction system in the presence or absence of polymerized monomers.

In another embodiment according to the present invention, the PTFE may be used in the form of particles dispersed in a solvent. The solvent is preferably a polar solvent having a good compatibility with water that is used in suspension polymerization, and is more preferably water. In an embodiment of the present invention, the PTFE dispersed in water is prepared by aqueous suspension polymerization, and then can be introduced into the reaction system of the present invention.

In another embodiment of the present invention, the PTFE may be used in the form of latex. Generally, latex of PTFE is prepared such that it has 20 to 80% by weight of solid content. The PTFE latex may be prepared by batch, fed batch, continuous polymerization or the like. There are no specific limitations regarding the preparing method of the PTFE latex.

In the present invention, the PTFEs are commercially available from various manufacturers. For example, JF-4DC containing about 60% of PTFE (from Zhejiung Jusheng Fluorochemical Co., Ltd.) and FR301B (from Shanghai 3F New Materials Co., Ltd.) are commercially available.

In the present invention, PTFE preferably has an average particle size of about 0.005 to about 500 mm for the sake of dispersability and anti-drip property of the final products. More preferably, PTFE has an average particle size of about 0.1 to about 40 mm. In case where the PTFE particles are too large, a dispersion of the particles is poor, and in case where the PTFE particles are too small, anti-drip effect becomes worse.

In this embodiment of the present invention, when a particle size of PTFE to be used is small, it is preferable to use PTFE in the form of latex, and when a particle size of PTFE to be used is large, it is preferable to use PTFE in the form of fine particles or dispersed particles. In an embodiment of the present invention, the fine particles can be obtained in various sizes by controlling the conditions of salting out of the PTFE latex. When an average particle diameter of the fine particles is large, the fine particles can be used after pulverizing them by means of a mill or a ball mill. There are no specific limitations regarding the mill or the ball mill.

In the present invention, the polymer that can be obtained by means of suspension polymerization in the presence of PTFE is a polymer produced by polymerizing a styrene-based monomer that contains or does not contain a small amount of copolymerizable ethylenically unsaturated monomer, an acrylic monomer or a mixed monomer thereof. An example of the styrene-based polymer includes polystyrene, poly(a-alkylstyrene), for example poly-a-methylstyrene, poly-a-ethylstyrene, poly-a-propylstyrene, poly-a-butylstyrene, poly-p-methylstyrene, halogenated polystyrene and the like. An example of the acrylic polymer includes acryl polymer such as polyacrylonitrile, polymethacrylonitrile, poly(alkylacrylate) such as poly (methylacrylate), poly(ethylacrylate), poly (propylacrylate) and poly (butylacrylate), poly(alkylmethacylate) such as poly(methylmethacrylate), poly(ethylmethacrylate), poly(propylmethacrylate) and poly(butylmethacrylate), polybutadiene, poly(vinyl acetate), poly(vinyl chloride), poly(vinylidene chloride), poly(vinylidene fluoride), poly (vinyl alcohol), and a mixture thereof.

In one preferred embodiment of the present invention, the polymer that can be obtained by means of suspension polymerization in the presence of PTFE is preferably polystyrene, poly(a-alkylstyrene), particularly poly a-methylstyrene), vinyl polymer, particularly poly(vinyl chloride), poly (vinyl acetate) and poly(methylacrylate).

In another preferred embodiment of the present invention, the copolymer that can be obtained by means of suspension polymerization in the presence of PTFE preferably includes a copolymer of styrene, alkylacrylate, alkylmethacrylate, vinyl chloride and other monomer such as acrylonitrile, methacrylonitrile, alkyl methacrylonitrile, or alkyl acrylate monomer, and grafted polymer, for example polybutadiene, polychloroprene, or styrene-butadien, for example acrylonitrile-butadiene copolymer rubber, alkyl acrylate rubber, styrene-butadiene rubber, EPDM rubber or silicone rubber.

In the present invention, copolymer that can be obtained by suspension polymerization in the presence of PTFE is more preferably styrene-acrylonitrile (SAN) copolymer and acrylonitrile-butadiene-styrene (ABS) copolymer, a-alkyl-styrene-acrylonitrile copolymer, particularly a-methylstyrene-acrylonitrile (AMSAN) copolymer, styrene-butadiene rubber (SBR), and a mixture thereof. The copolymer is most preferably Styrene-acrylonitrile copolymer.

In the present invention, the weight ratio of the monomer to be suspension polymerized in the presence of PTFE should be controlled for the sake of the stability of the suspension polymerization system. In the practice of the present invention, the weight ratio of PTFE to the monomer to be suspension polymerized in the presence of PTFE is preferably about 0.001:99.999 to 9:1. The weight ratio of PTFE to the monomer to be suspension polymerized in the presence of PTFE is more preferably about 2:8 to 8:2. In the practice of the present invention, when the PTFE ratio is too high, the dispersability becomes poor, on the contrary when the PTFE ratio is too low, there is no problem regarding the polymerization reaction, but an economic efficiency becomes deteriorated.

In the present invention, the time point when PTFE is introduced into the suspension reaction system can be controlled for the sake of the stability of a suspension polymerization system. In principle, the PTFE can be introduced into the reaction system only during the suspension polymerization. Preferably, the PTFE is introduced into the reaction system during a first half of polymerization cycle for a stable suspension reaction system. An introduction mode of the monomer can be a batch or a fed batch. PTFE is more preferably introduced before the beginning of the polymerization.

In the present invention, a polymerization initiator can be used for polymerizing a monomer or a mixture of monomers. The polymerization initiator monomer can be at least one polymerization initiator selected from the group consisting of organic peroxides, azo-based nitrile compound, azo-based acylic amizine compound, azo-based cyclic amizine compound, azo-based amide compound, azo-based alkyl compound and azo-based ester compound. An example of the organic peroxides includes specifically benzoylperoxide, o-chlorobenzoyl peroxide, o-methoxybenzoyl peroxide, lauroyl peroxide, octanoyl peroxide, methylethylketo peroxide, diisopropylperoxydicarbonate, cumenehydroperoxide, cylcohexanone peroxide, t-butylhydroperoxide, diisopropylbenzenehydroperoxide and the like. These organic peroxides can be used alone or in any combination thereof.

An example of the azo-based polymerization initiators includes azo-based nitrile compound, for example 2,2'-azobisisobutyonitrile (AIBN), azo-based acyclic amizine compound, for example 2,2'-azobis(2-methyl-N-phenylpropionamizine)dihydrochloride, 2,2'-azobis[N-(4-chlorophenyl)-2-methylpropionamizine]dihydrochloride, azo-based amide compound, for example 2,2'-azobis 2-methyl-N'-1,1-bis(hydroxymethyl)-2-hydroxyethyl]propionamide, 2,2'-azobis[2-methyl-N-(2-hydroxyethyl)propionamide], azo-based alkyl compound, for example 2,2'-azobis(2,4,4-trimethylpentane), 2,2'-azobis(2-methylpropyne), azo-based ester compounds, for example dimethyl-2,2'-azobis(2-methylpropionate) and the like. These azo-based polymerization initiators can be used alone or in any combination thereof.

In the present invention, the polymerization initiator can be used in the solubilized form in the monomer or a mixture of the monomer used in the polymerization. The polymerization initiator is preferably used in an amount of 0.001 parts by weight to 5.0 parts by weight based on the 100 parts by weight of the monomer to be suspension polymerized. Adding the polymerization initiator is carried out by known methods.

For the preparation method of the present invention, a dispersion stabilizer is preferably added to the suspension (reaction liquid) to stabilize the suspension, if necessary. An example of the dispersion stabilizer includes specifically water soluble polymers such as polyvinylalcohol, gelatin, tragacanth, starch, methylcellulose, carboxymethylcellulose, hydroxyethylcellulose, sodium polyacrylate, sodium polymethacrylate and the like, or inorganic materials that are difficult to be solubilize in water, such as sodium pyrophosphate, hydroxy apatite, methylcellulose, calcium phosphate, magnesium pyrophosphate, sodium pyrophosphate. Sparingly soluble inorganic dispersing agents are more preferable. The dispersion stabilizer is preferable used in an amount of 0.01 to 29% by weight, more preferable 0.1 to 20% by weight based on the total weight of the monomer. Particles in a certain range can be obtained by setting the amount of the dispersion stabilizers in the above range. Also, adding the dispersion stabilizer is carried out by known methods in the art.

The size of the final particles affects their dispersion during recovery and blending. Accordingly, the average size of particles containing PTFE is in a range of about 0.01 to 20 mm, more preferable in a range of 0.2 to 5 mm. When the average size of the particles is too small, it is difficult to filter and recover suspension polymerizations, and when the average size is too large, the dispersability becomes poor.

To stabilize a dispersion system, a dispersion aid can be used additionally in the present invention. Anionic surfactants, cationic surfactants, amphoteric surfactants nonionic surfactants and the like can be used as the dispersion aid. An example of anionic surfactants includes specifically alkali metal salts of fatty acid oil such as sodium oleate, castor oil and the like, alkyl sulfate ester salts such as sodium laurylsulfate, ammonium laurylsulfate and the like, alkylbenzene sulfonate such as sodium dodecyl benzene sulfonate and the like, alkyl naphthalene sulfonate, alkyl sulfonate, dialkyl sulfosuccinate, alkyl phosphate ester, naphthalene sulfonic acid-formaldehyde condensate, polyoxyethylenealkylphenyl-ethylsulfate ester, polyoxyethylenealkylsulfate ester and the like. An example of the cationic surfactants includes specifically alkyl amine salts such as laurylamine acetate, stearylamine acetate and the like, quaternary ammonium salts such as lauryltrimethylammonium chloride and the like. An example of the amphoteric surfactants includes specifically lauryldimethylamineoxide and the like. An example of the nonionic surfactants includes specifically polyoxyethylenealkylether, polyoxyethylenealkylphenylether, polyoxyethylene fatty acid ester, sorbitan fatty acid ester, polyoxysorbitan fatty acid ester, polyoxyethylene alkylamine, glycerin fatty acid ester, oxyethylene-oxypropylene block copolymer and the like. The dispersion aids is preferably used in an amount of 0.003 to 5.0 parts by weight based on 100 parts by weight of the water.

For the suspension polymerization of the present invention, it is possible to control the amount of the organic phase, namely the solid content after the suspension polymerization for accomplishing more stable dispersion system. The solid content of the final suspension polymer is preferably about 5 to 80% by weight. When the content of the final dispersants is less than 5% by weight, it is difficult to maintain economic efficiency, and when it is greater than the content, it is difficult to wash reaction vessels.

A suitable polymerization temperature of suspension polymerization is in the range of 10° C. to 250° C., most preferably 30° C. to 150° C. Also, preferably, the suspension polymerization is carried out under an inert atmosphere such as nitrogen gas. A stirring during the suspension polymerization is preferably carried out by means of any apparatus that can stir the reaction liquid vigorously so as to avoid an enlargement or an adhesion of the resulting PTFE containing particles. A specific example of the stirrer includes a so-called high speed stirrer such as a line mixer, a homomixer and the like. Since the particle diameter can be controlled by the suspension polymerization, it is possible to obtain PTFE containing particles having uniform particle diameter, namely narrow distribution of particle size. Also, it is possible to add and combine to the suspension according to the present invention, if necessary, any conventional additive having no adverse effect to the polymerization, for example colorants such as dyes or pigments, plasticizers, polymerization stabilizers, fluorescent extenders, magnetic powders, UV absorbers, anti-static agents, flame retardants and the like.

There are no specific limitations regarding an extracting method for extracting PTFE containing particles from the suspensions, but a filtering method and a method using separator such as centrifuger are used simply. After extracting the particles from the suspension, the resulting particles are washed and dried if necessary. Also, there are no specific limitations regarding drying temperature or drying method. The water content of the PTFE containing particles of the present invention is 10% or less, preferably 7% or less, more preferably 5% or less, even more preferably 3%. The water content after drying is determined by weight reduction before and after drying.

In the present invention, the produced powder can be used as anti-drip flame retarding additives after drying. The drying can be carried out by means of a conventional dryer such as a hot wind dryer, a fluidized dryer, a vacuum dryer and the like. In the present invention, the dried powder can be kneaded with engineering plastics. The kneading can be carried out by means of a conventional mixer such as a tumbler, a V-mixer, a rotating mixer. In one embodiment of the present invention, the kneaded product can be extruded by means of a conventional extruder such as a single extruder or a twin extruder. There are no specific limitations regarding extrusion procedure.

Advantageous Effects

According to the present invention, there is provided a method for manufacturing a PTFE-containing powder using suspension polymerization. Also, according to the present invention, there is provided a method for manufacturing the powder comprising PTFE by suspension polymerizing a styrene-based monomer, an acrylic monomer or a mixed monomer thereof in the presence of PTFE. Further, there is provided a powder comprising PTFE obtained by suspension polymerization of a monomer or a monomer mixture in the presence of PTFE. The powder can be used as an anti-drip additive of flame retardants.

MODE FOR INVENTION

Suspension Polymerization

Example 1

27 kg of styrene, 3 kg of acrylonitrile and 210 g of benzoyl peroxide were introduced into a reactor containing 75 kg of deionized water and 50 kg of L-TEFLON (commercially available PTFE under the trade name of FR 301B; solid content: 60%), and the mixture was stirred. To the stirred mixture, 1.2 kg of hydroxyapatite and 80 g of sodium alkylbenzenesulfonate were added and stirred at 300 RPM. The content in the reactor was heated to 75° C. and kept at that temperature for 7 hrs, and then heated to 120° C. and kept at that temperature for 3 hrs, thus terminating the polymerization of the compounds. The aqueous phase was removed to afford uniform beads having an average diameter of 1.1 mm. The obtained beads were dried using a fan heater.

Example 2

27 kg of styrene, 3 kg of acrylonitrile and 210 g of benzoyl peroxide were introduced into the reactor containing 75 kg of deionized water and 50 kg of L-TEFLON (commercially available PTFE under the trade name of FR 301B; solid content: 60%), and the mixture was stirred. To the stirred mixture, 78 g of polyvinylalcohol (Dongyang steel chemical Co., Ltd.) and 80 g of sodium alkylbenzenesulfonate were added and stirred at 400 RPM. The content in the reactor is heated to 75° C. and kept at that temperature for 7 hrs, and then heated to 120° C. and kept for 3 his, thus terminating the polymerization of the compounds. The aqueous phase was removed to afford uniform beads having an average diameter of 0.8 mm. The obtained beads were dried using a fan heater.

Example 3

21 kg of styrene, 9 kg of acrylonitrile and 210 g of benzoyl peroxide were introduced into the reactor containing 75 kg of deionized water and 50 kg of L Teflon L-TEFLON (commercially available PTFE under the trade name of FR 301B; solid content: 60%), and the mixture was stirred. To the stirred mixture, 1.2 kg of hydroxy apatite and 80 g of sodium alkylbenzenesulfonate were added and stirred at 300 RPM. The content in the reactor is heated to 75° C. and kept at that temperature for 7 hrs, and then heated to 120° C. and kept at that temperature for 3 hrs, thus terminating the polymerization of the compounds. The aqueous phase was removed to afford uniform beads having an average diameter of 1.8 mm. The obtained beads were dried using a fan heater.

Example 4

A mixture prepared by mixing 30 kg of TEFLON powder (commercially available PTFE under the trade name of JF-4DC), 21 kg of styrene and 9 kg of acrylonitrile in a separate vessel was introduced into a reactor containing 90 kg of deionized water, the mixture is stirred. To the stirred mixture, 1.2 kg of hydroxyapatite and 80 g of sodium alkylbenzenesulfonate were added and stirred at 500 RPM. The content in the reactor is heated to 75° C. and kept at that temperature for 8 hrs, and then heated to 120° C. and kept at that temperature for 3 hrs, thus terminating the polymerization of the compounds. The aqueous phase was removed to afford uniform beads having an average diameter of 1.4 mm. The obtained beads were dried using a fan heater.

Test for Improvements of Flame Retardancy

Example 5

The beads obtained in the examples 1 to 4 and ABS/PC purchased from LG chemical Co., Ltd. were kneaded, and UL94 flame retarding test was carried out. The flame retarding test was carried out for anti-drip property, and the results were shown in the Table 1.

Comparative Examples 1 and 2

Same amount of PTFE (JF4DC) and same ABS/PC purchased from LG chemical Co., Ltd. were kneaded, and anti-drip property was checked according to standard test method (UL94 flame retarding test). The results for ABS/PC that tetraethylenefluoro polymer was not added were also shown in the Table 1.

TABLE 1

|  | ABS/PC | TPP | PTFE | Polymer of the present invention | UL94 |
|---|---|---|---|---|---|
| Example 1 | 100 | 15 |  | 0.5 | V-0 |
| Example 2 | 100 | 15 |  | 0.5 | V-0 |
| Example 3 | 100 | 15 |  | 0.5 | V-0 |
| Example 4 | 100 | 15 |  | 0.5 | V-0 |
| Comparative example 1 | 100 | 15 | 0.25 |  | V-2 |
| Comparative example 2 | 100 | 15 | 0.5 |  | V-0 |

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A method for preparing a PTFE-containing polymerization powder, the method comprising:
   introducing a mixture of a styrene monomer and an acrylonitrile monomer in the presence of PTFE to water, the PTFE having a size of about 0.1 to about 40 μm;
   dispersing the mixture of the styrene monomer and the acrylonitrile monomer, and the PTFE with a dispersing stabilizer to form a dispersed mixture; and
   suspension polymerizing the dispersed mixture,
   wherein the PTFE-containing polymerization powder produced has an average particle size of about 0.2 to about 5 mm.

2. The method according to claim 1, wherein a weight ratio of PTFE to the mixture of the styrene monomer and the acrylonitrile monomer is about 0.001:99.999 to about 9:1.

3. The method according to claim 1, wherein the PTFE is introduced in a form selected from the group consisting of fine powders, suspension dispersoids and latex.

* * * * *

UNITED STATES PATENT AND TRADEMARK OFFICE
CERTIFICATE OF CORRECTION

PATENT NO. : 8,389,633 B2  
APPLICATION NO. : 11/817988  
DATED : March 5, 2013  
INVENTOR(S) : Ji-Ho Park Page 1 of 1

It is certified that error appears in the above-identified patent and that said Letters Patent is hereby corrected as shown below:

In the Specification:

In Col. 1, lines 6-7, "(hereinafter, referred to as "PTFE"" should read --(hereinafter, referred to as "PTFE")--.

In Col. 1, lines 51-52, "process is so complicate" should read --process is so complicated--.

In Col. 2, line 13, "The present inventors have found" should read --The present inventor has found--.

In Col. 2, line 61, "to about 500 mm" should read --to about 500 μm--.

In Col. 2, line 64, "to about 40 mm" should read --to about 40μm--.

In Col. 2, line 65, "and in case where" should read --and in the case where--.

In Col. 3, line 34, "poly (a-alkylstyrene)" should read --poly (α-alkylstyrene)--.

In Col. 3, line 34, "poly a-methylstyrene)" should read --poly (α-methylstyrene)--.

In Col. 4, line 34, "N'-1,1-bis(hydroxymethyl)" should read --[N'-1,1-bis(hydroxymethyl)--.

In Col. 4, line 57, "to be solubilize in water" should read --to be solubilized in water--.

In Col. 4, line 61, "is preferable used in" should read --is preferably used in--.

In Col. 5, line 10, "amphoteric surfactants nonionic" should read --amphoteric surfactants, nonionic--.

In Col. 5, line 32, "dispersion aids is preferably used" should read --dispersion aids are preferably used--.

In Col. 6, line 67, "kept for 3 his, thus terminating" should read --kept for 3 hrs., thus terminating--.

Signed and Sealed this  
Eighteenth Day of June, 2013

Teresa Stanek Rea  
*Acting Director of the United States Patent and Trademark Office*